(12) United States Patent
Risse et al.

(10) Patent No.: US 9,527,444 B2
(45) Date of Patent: Dec. 27, 2016

(54) REAR AREA MONITORING DEVICE FOR A VEHICLE

(75) Inventors: Rainer Risse, Pattensen-Reden (DE);
Udo Ronnenberg, Wedemark (DE);
Axel Stender, Hameln (DE);
Jan-Christoph Von Der Beeke,
Braunschweig (DE)

(73) Assignee: WABCO GmbH, Hannover (DE)

( * ) Notice: Subject to any disclaimer, the term of this patent is extended or adjusted under 35 U.S.C. 154(b) by 49 days.

(21) Appl. No.: 14/235,501

(22) PCT Filed: May 18, 2012

(86) PCT No.: PCT/EP2012/002128
§ 371 (c)(1),
(2), (4) Date: Jan. 28, 2014

(87) PCT Pub. No.: WO2013/023712
PCT Pub. Date: Feb. 21, 2013

(65) Prior Publication Data
US 2014/0207354 A1  Jul. 24, 2014

(30) Foreign Application Priority Data
Aug. 12, 2011 (DE) .................. 10 2011 110 409

(51) Int. Cl.
*G08G 1/16* (2006.01)
*B60R 1/00* (2006.01)

(52) U.S. Cl.
CPC .............. *B60R 1/002* (2013.01); *G08G 1/16* (2013.01); *G08G 1/165* (2013.01); *G08G 1/168* (2013.01)

(58) Field of Classification Search
None
See application file for complete search history.

(56) References Cited

U.S. PATENT DOCUMENTS 4,822,222 A * 4/1989 Zeuner et al. ............... 410/29.1
5,419,621 A   5/1995 Horst
(Continued)

FOREIGN PATENT DOCUMENTS

DE   198 31 262 C2   1/2000
DE   102 61 018 A1   7/2004
(Continued)

OTHER PUBLICATIONS

Rieth, Lukas; Machine Translation of German Patent Application Publication DE 20 2010 012 380 U1; Dec. 2, 2010.*
(Continued)

*Primary Examiner* — John R Olszewski
*Assistant Examiner* — David Merlino
(74) *Attorney, Agent, or Firm* — Warner Norcross & Judd LLP

(57) ABSTRACT

A rear area monitoring device for a vehicle includes one or more distance sensors configured to determine the distance of the rear of the vehicle from an obstacle, and at least one electronic control device configured to evaluate the data collected by the distance sensor(s) and to determine a distance signal that indicates the current distance of the rear of the vehicle from the obstacle. The electronic control device includes at least one input connection for a position sensor configured to detect the position of at least one adjustable vehicle component that, in certain positions, projects beyond the rear of the vehicle. The electronic control device is configured to determine the distance signal depending upon the signal of the position sensor.

12 Claims, 3 Drawing Sheets

(56) References Cited

U.S. PATENT DOCUMENTS

| | | | |
|---|---|---|---|
| 5,563,483 A * | 10/1996 | Kowall | E05B 81/14 |
| | | | 318/266 |
| 6,204,753 B1 | 3/2001 | Schenk et al. | |
| 6,411,054 B1 * | 6/2002 | Van Wiemeersch | |
| | | | G07C 9/00182 |
| | | | 318/266 |
| 6,604,592 B2 | 8/2003 | Pietsch et al. | |
| 6,879,914 B2 | 4/2005 | Hoenes et al. | |
| 7,151,350 B2 * | 12/2006 | Haag | G01S 13/04 |
| | | | 318/280 |
| 7,357,435 B2 * | 4/2008 | Robertson | B60R 25/1001 |
| | | | 296/146.4 |
| 7,403,102 B2 | 7/2008 | Fukuda et al. | |
| 8,493,236 B2 | 7/2013 | Boehme et al. | |
| 2003/0039126 A1 * | 2/2003 | Fox | B60Q 1/44 |
| | | | 362/485 |
| 2004/0167718 A1 * | 8/2004 | Hoenes | B60Q 9/006 |
| | | | 701/301 |
| 2004/0181338 A1 * | 9/2004 | Dobler | G08G 1/166 |
| | | | 701/301 |
| 2006/0103512 A1 | 5/2006 | Fukuda et al. | |
| 2009/0259365 A1 * | 10/2009 | Rohlfs et al. | 701/41 |
| 2012/0221236 A1 * | 8/2012 | Zeller | G08G 1/16 |
| | | | 701/301 |

FOREIGN PATENT DOCUMENTS

| | | | | |
|---|---|---|---|---|
| DE | 10 2009 021 282 A1 | | 11/2010 | |
| DE | 202010012380 U1 | * | 12/2010 | |
| DE | 10 2009 032 542 A1 | | 1/2011 | |
| DE | 202010012380 | * | 1/2011 | B60Q 9/006 |
| DE | 102012209048 A1 | * | 12/2013 | E05F 15/40 |
| EP | 0 602 353 A1 | | 6/1994 | |
| EP | 0 939 003 A1 | | 9/1999 | |
| EP | 1 434 186 A2 | | 6/2004 | |
| JP | 2005299232 A | * | 10/2005 | |
| KR | 20050021159 A | * | 3/2005 | |
| KR | 20100059127 A | * | 6/2010 | |

OTHER PUBLICATIONS

Reith, Lukas; English abstract of WO 2012 051976 corresponding to DE 20 2010 012 380; Apr. 2012.*

Reith, Machine translation of DE202010012380, Jan. 5, 2011, translation by espacenet.com.*

* cited by examiner

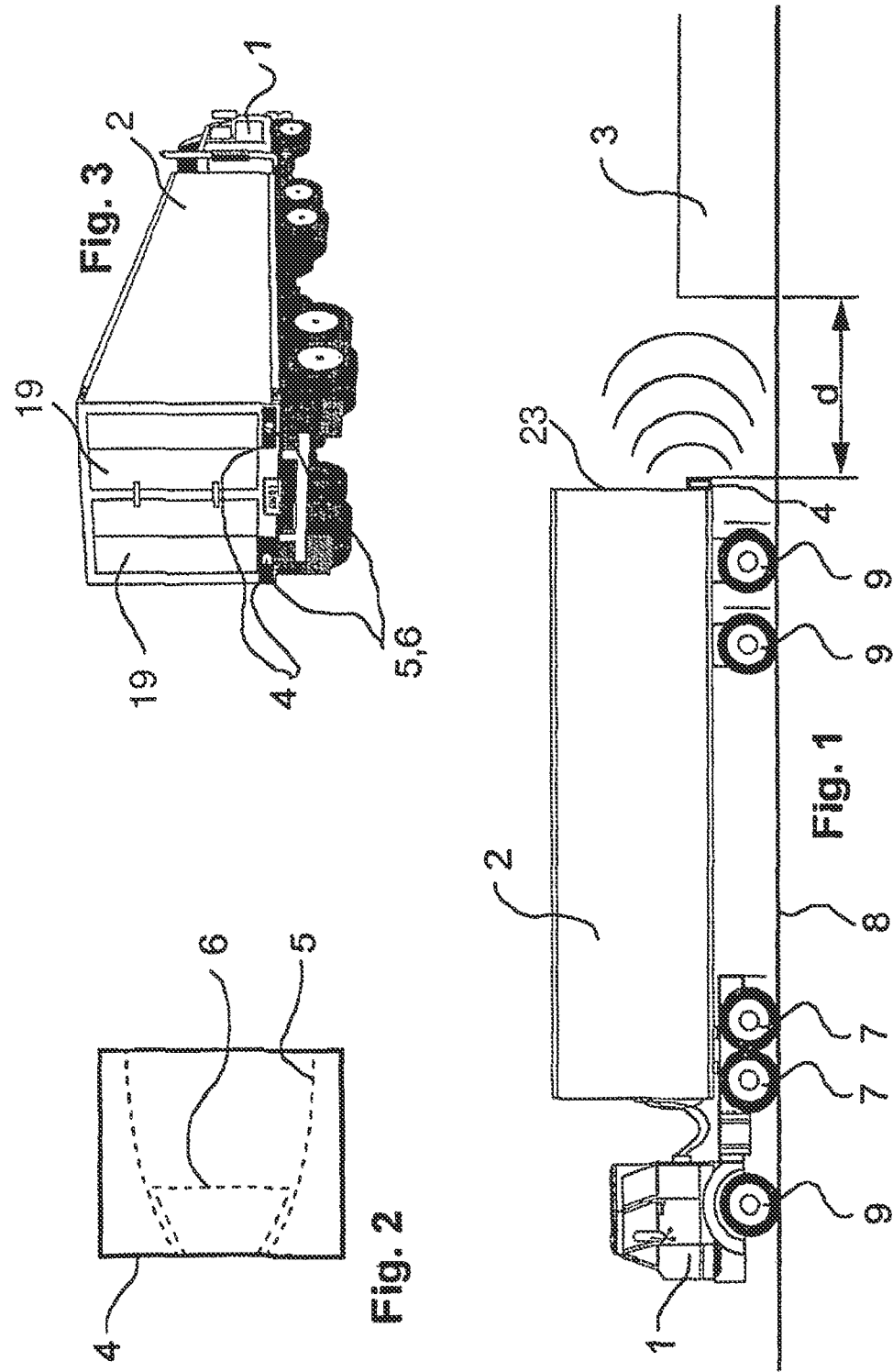

REAR AREA MONITORING DEVICE FOR A VEHICLE

FIELD OF THE INVENTION

The invention generally relates to a rear area monitoring device for a vehicle and to an electronic control device thereof.

BACKGROUND OF THE INVENTION

Rear area monitoring devices are used in automobiles and trucks in order to signal to the driver when reversing, e.g., when parking in a parking space, the distance of the rear of the vehicle from an obstruction or when the distance to the obstruction falls below a minimum distance. In relation to commercial vehicles, i.e., trucks and their trailers, rear area monitoring devices are used, e.g., to assist the driver in approaching a loading ramp in reverse. A rear area monitoring device is described in Applicant's DE 198 31 262 C2.

SUMMARY OF THE INVENTION

Generally speaking, it is an object of the present invention to expand the range of use and application areas of a rear area monitoring device.

This object is achievable by a rear area monitoring device for a vehicle comprising one or more distance sensors, which are configured to determine the distance of the rear of the vehicle from an obstruction, and at least one electronic control device, which is configured to evaluate the data recorded by the distance sensors and to determine a distance signal indicating the current distance of the rear of the vehicle from an obstruction. The electronic control device comprises at least one input connector for a position sensor, which is configured to detect the position of at least one adjustable component of the vehicle that, in certain positions, protrudes beyond the rear of the vehicle. The position sensor can be connected via the input connector to the electronic control device and the electronic control device is configured to determine the distance signal depending on the signal of the position sensor.

It will be appreciated that the inventive rear area monitoring device can be used in many applications and can be better adapted to the respective operating conditions of the vehicle. Especially for trucks, a large variety of vehicle structures, movable doors and flaps, such as, e.g., built-in loading platforms, and lifting platforms are provided on the rear of the vehicle or tailgate. Such structures can cause a vehicle component to protrude beyond the rear of the vehicle such that a distance sensor disposed on the rear of the vehicle may not readily detect the risk of an impact of the component with an obstruction. For this purpose, a position sensor is provided that is constructed and arranged to detect the position of one or more adjustable components of the vehicle that protrude beyond the rear of the vehicle in certain positions, and the signal of the position sensor can be taken into account during the determination of the distance signal. This enables a realistic distance signal to be produced.

The rear area monitoring device can, e.g., be used for vehicles with a loading platform or a tailgate, e.g., for internal loaders for panes of glass with a large tailgate.

The position sensor can be implemented differently, e.g., in the form of an inexpensive switch contact, which is acted upon mechanically by the vehicle component in certain positions, as a proximity switch in the area near the adjustable component of the vehicle, as a displacement sensor, e.g., with a potentiometer, or as an ultrasonic sensor. Advantageously, the position sensor can also be a pressure sensor or pressure switch that senses the pressure of a hydraulic actuator of the adjustable component of the vehicle. In many cases, the adjustable vehicle component also already comprises a position sensor, which can be connected via the input connector to the electronic control device. The position sensor can also be provided as an additional component of the rear area monitoring device. In this case, the position sensor is connected via the input connector to the electronic control device.

The distance signal can be a signal that directly gives the distance of the rear of the vehicle from an obstruction in numerical form, e.g., the distance in meters or centimeters. The distance signal can also be a signal that is already pre-processed or suitably evaluated, which contains information about whether the distance of the rear of the vehicle from an obstruction is already less than a specified limit or not.

The rear of the vehicle means the rearmost part of the vehicle that is not adjustable, such as, e.g., a rear bumper or the rear loading edge of a load area.

According to an embodiment of the present invention, the electronic control device is configured to correct the data detected by the distance sensor(s) by a specified difference value if the signal of the position sensor is indicating a vehicle component protruding beyond the rear of the vehicle. This has the advantage that a more accurate determination of the distance of the rear of the vehicle from an obstruction depending on the adopted position of the adjustable component of the vehicle can be carried out mathematically by the electronic control device, so that taking the position signal into account can be carried out inexpensively, e.g., in the form of an expansion of the programming of the electronic control device. Thus, e.g., the distance signal can be determined according to the data provided by the distance sensor(s) if the signal of the position sensor is not indicating a vehicle component protruding beyond the rear of the vehicle. If, on the other hand, the signal of the position sensor is indicating a vehicle component protruding beyond the rear of the vehicle, the specified difference value is subtracted from the data detected by the distance sensor(s) in order to determine the distance signal. The specified difference value can, e.g., be determined from the maximum reach of the adjustable component of the vehicle beyond the rear of the vehicle, e.g., for vehicles with a loading platform it will have a value of 2 m.

According to another embodiment, the electronic control device is configured to compare the data detected by the distance sensor(s) with at least one specified first limit and to determine therefrom a distance signal that indicates that the distance of the rear of the vehicle from an obstruction has reached or fallen below a preselected distance. This has the advantage that the distance signal already contains an assessment of the distance of the rear of the vehicle from the obstruction, which can be helpful to the driver. Using the distance signal evaluated in this way, e.g., a warning can be generated, such as, e.g., an acoustic, haptic or visual warning signal. The driver is then on notice that the vehicle is already relatively close to the obstruction. The electronic control device can also be configured to compare the data detected by the distance sensors with various limits and to determine therefrom a suitably graduated distance signal that differently indicates reaching or falling below the individual limits. Achieving or falling below the individual limits can, e.g., be indicated by different warning signals.

According to a further embodiment, the electronic control device is configured to correct the data detected by the distance sensor(s), the specified first limit or the difference between the data detected by the distance sensor(s) and the specified first limit by a specified difference value or to use a specified second limit for the comparison if the signal of the position sensor is indicating a vehicle component protruding beyond the rear of the vehicle. The second limit can, e.g., be greater than the first limit by the specified difference value. This has the advantage that the distance signal obtained by comparison with the first or the second limit is more realistic than with conventional rear area monitoring devices. Thus, e.g., it is not required to ensure that the distance signal has basically already been corrected with the difference value in order to avoid any damage by a vehicle component protruding beyond the rear of the vehicle. Rather, the correction can be carried out depending on the signal of the position sensor. Another advantage is that accounting for the position signal can be carried out arithmetically by the electronic control device and can thus be implemented inexpensively, e.g., in the form of an extension of the programming of the electronic control device.

According to another embodiment of the present invention, the electronic control device is arranged to visually, haptically and/or acoustically output the distance signal via an output of the rear area monitoring device or via an interface to other output devices of the vehicle. The output can, e.g., be a display panel of the rear area monitoring device or of the vehicle, e.g., in the instrument panel of the vehicle. The distance signal can, e.g., be displayed on the display panel in clear text in the form of a distance in meters or centimeters. The distance signal can also be output in already evaluated form via the output, e.g., following comparison with the first limit, by a warning signal being output on reaching or falling below a specified distance of the rear of the vehicle from the obstruction. The distance signal or the warning signal can be output visually, e.g., by a lamp or the display panel. The distance signal can also be output haptically, e.g., by actively operated control elements of the vehicle, e.g., a gas pedal with a force feedback function, or by controlling the vehicle seat adjustment, e.g., as in a vibration alarm. The warning signal can also be output acoustically, e.g., in the form of warning tones of identical or different frequency.

According to yet another embodiment, the electronic control device is configured to generate a brake actuation signal depending on the distance signal for automatically actuating at least one vehicle brake. This has the advantage that, as a result of the automatic braking, the vehicle can be safely stopped at a sufficient remaining distance from the obstruction, and, thus, damage to the vehicle and a loading ramp can be more reliably avoided. The electronic control device can send the brake actuation signal, e.g., via a data bus, to a brake controller, which then ensures the operation of the vehicle brake. The electronic control device can also be a part of an electronically controlled brake system, so that the brake actuation signal can be directly converted into the operation of the vehicle brake. This has the advantage that the vehicle can be automatically stopped at an advantageous distance from a loading ramp as a result of the more realistic determination of the distance signal. It must not be stopped, e.g., for safety reasons, at too great a distance from the loading ramp, although with no protruding vehicle component, a sufficient safety distance is still provided for maneuvering. This allows truck loading and unloading processes to be carried out more safely, faster and more efficiently, because the correct distance to the loading ramp that is necessary for loading or unloading can be produced automatically.

According to a further embodiment, the rear area monitoring device comprises at least two distance sensors. The electronic control device is configured to determine the distance signal depending on the data detected by a first subset of the distance sensors if the signal of the position sensor is not indicating a vehicle component protruding beyond the rear of the vehicle. The electronic control device is configured to determine the distance signal depending on the data detected by a second subset of the distance sensors if the signal of the position sensor is indicating a vehicle component protruding beyond the rear of the vehicle. This has the advantage that different distance sensors disposed on the vehicle for determining the distance signal can be automatically taken into account.

The vehicle component protruding beyond the rear of the vehicle can affect individual distance sensors with regards to their detection of obstructions if it is protruding beyond the rear of the vehicle. For example, a lowered loading platform can cover individual distance sensors in the form of ultrasonic sensors that are attached to the rear of the vehicle at the height of the load area, so that they cannot contribute to determining a meaningful distance signal. Such effects can be accommodated by taking into account the signal of the position sensor.

According to a still further embodiment, the first subset of the distance sensors is arranged for attachment to the rear of the vehicle and the second subset of the distance sensors is arranged for attachment to the adjustable vehicle component that, in certain positions, protrudes beyond the rear of the vehicle. This has the advantage that, in one position of the adjustable component of the vehicle in which it is not protruding beyond the rear of the vehicle, the first subset of the distance sensors can be used for distance signal determination. If the vehicle component is protruding beyond the rear of the vehicle, the second subset of the distance sensors can be used for determining the distance signal, wherein the distance sensors then indicate the correct distance to the obstruction quasi-automatically, because they protrude beyond the rear of the vehicle together with the adjustable vehicle component. Another advantage is that the entire detection range of the rear area monitoring device can be extended to greater distances.

The electronic control device can comprise one or a plurality of connectors for the connection of one or a plurality of distance sensor(s).

According to another embodiment of the present invention, the rear area monitoring device comprises at least two distance sensors. A first subset of the distance sensors is attached to the rear of the vehicle. A second subset of the distance sensors is attached to the adjustable vehicle component that, in certain positions, protrudes beyond the rear of the vehicle.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is explained in more detail below using exemplary embodiments and with reference to the accompanying drawings in which:

FIG. 1 illustrates, in accordance with an embodiment of the present invention, a vehicle combination approaching a loading ramp when reversing;

FIG. 2 is a detailed view of an impact buffer with a distance sensor disposed therein in accordance with an embodiment of the present invention;

FIG. 3 is a rear perspective view of the vehicle according to FIG. 1;

In the figures the same reference characters are used for corresponding elements.

DETAILED DESCRIPTION OF THE PREFERRED EMBODIMENTS

Figure 4:
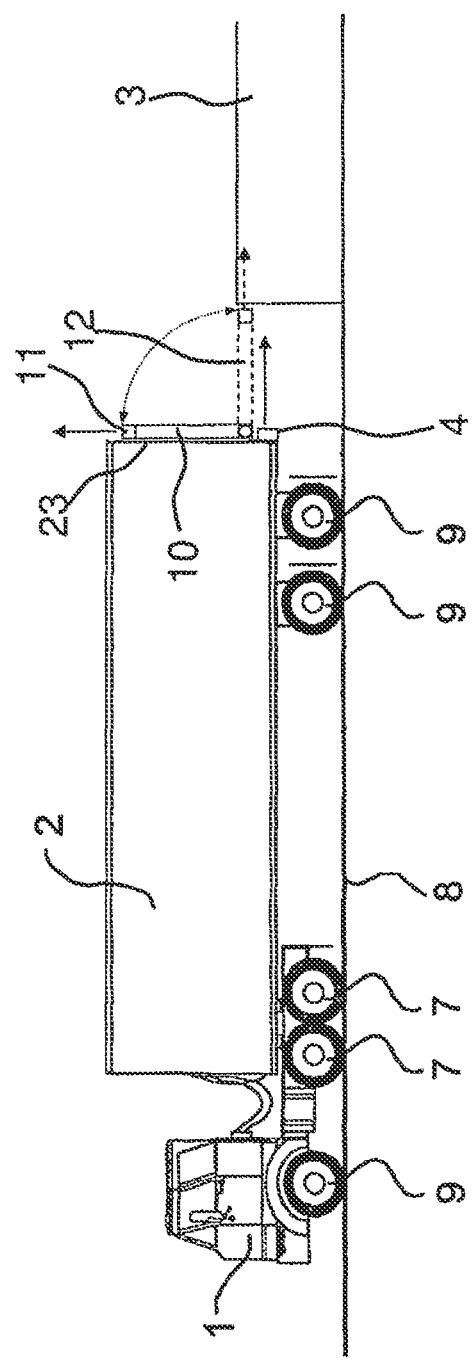
FIG. 4 shows another embodiment of a vehicle combination with an adjustable vehicle component.

FIG. 1 depicts an example of a vehicle combination with a tractor unit 1 and a trailer 2 coupled to the tractor unit 1. The invention is, however, suitable for all types of vehicles, including automobiles and trucks with other types of trailers.

The tractor unit 1 comprises a drive engine whose drive force is output via a gearbox operated by the driver of the vehicle to the drive wheels 7 of the tractor unit 1 and, hence, to the roadway 8. The drive engine and gearbox are of known construction and are therefore not shown in FIG. 1.

Furthermore, both the tractor unit 1 and also the trailer 2 comprise a brake system, with which a brake force can be exerted on the wheels 7 of the tractor unit 1 and the wheels 9 of the trailer 2 depending on the operation of a brake pedal disposed in the tractor unit 1 when operated by the driver.

In one advantageous embodiment, both the drive engine and also the brake systems of the tractor unit and trailer can be controlled by electrical signals. Such brake systems are usually referred to as electrically controllable brake systems or "EBS" for short, such as is known, e.g., from Applicant's EP 0 602 353 A1. For controlling the brake system, at least one electronic controller is provided here, which receives braking demand signals from a brake signal transmitter that can be operated by the driver using the brake pedal and determines brake operating signals therefrom, which are output to brake devices disposed on the wheels 7, 9.

Figure 5:
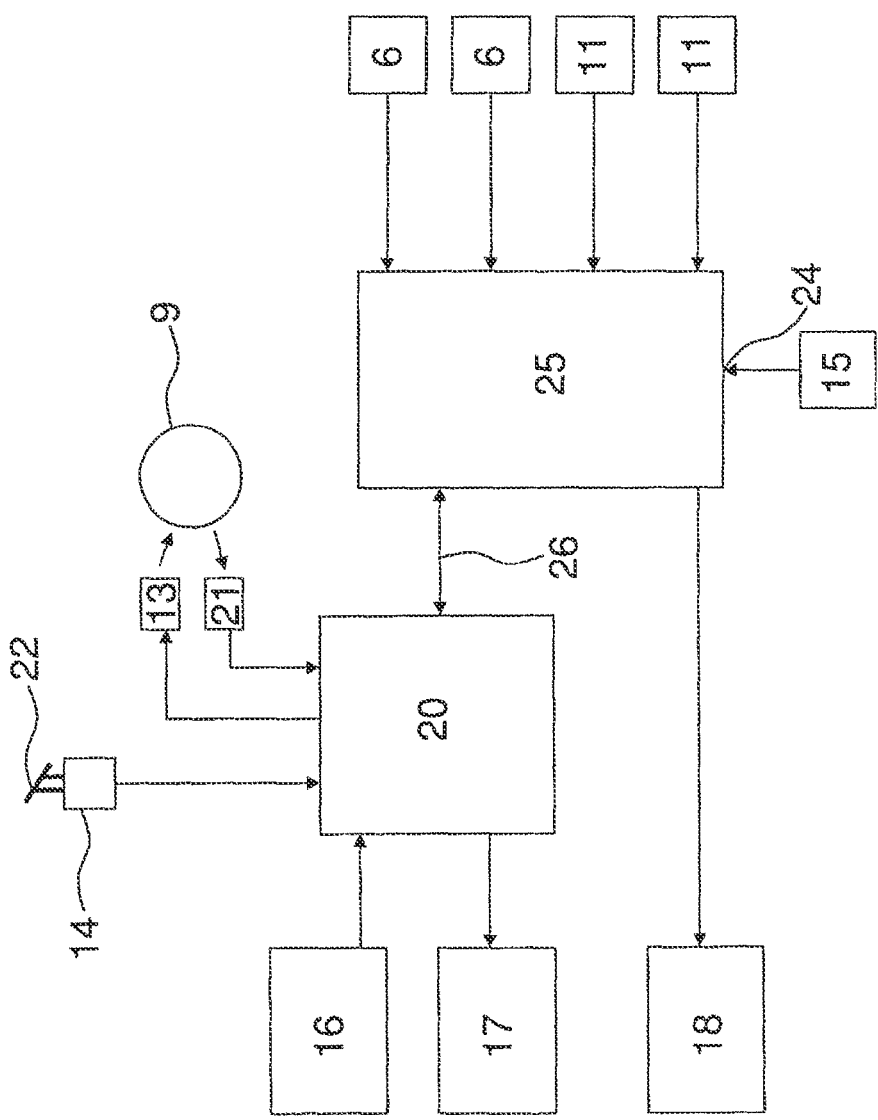
FIG. 5 is a schematic diagram depicting a rear area monitoring device in accordance with an embodiment of the present invention.

Furthermore, a sensor 21 for determining a speed signal is provided, as schematically illustrated in FIG. 5. It is known to use the tachometer of the vehicle for this purpose. It is also advantageous to use, for this purpose, a sensor disposed in the area of the vehicle wheel for determining the rotational speed of the wheel, as is known from anti-lock braking systems. This has the advantage that the speed of the vehicle can be determined very reliably and with great accuracy.

The vehicle according to FIG. 1 also comprises two impact buffers 4 disposed on the rear 23 of the trailer 2, which corresponds here to the rear of the vehicle, respectively disposed on the left and right sides of the vehicle under the edges of the load area. The arrangement of the impact buffers 4 is additionally illustrated in FIG. 3. The impact buffers 4 are preferably made of an elastic material, e.g. rubber, and are used to protect the vehicle against damage resulting from impact on an obstruction 3, e.g., a loading ramp.

In addition, for the vehicle combination according to FIG. 1, two more distance sensors are provided, each disposed in the impact buffers 4, which do not protrude out of the impact buffers 4 to avoid damage. The arrangement of a distance sensor 6 in an impact buffer 4 is illustrated in more detail in FIG. 2. The impact buffer 4 has an opening 5, which is in the form of a hopper that is oriented in the reversing direction of the vehicle. The distance sensor 6 is disposed within the opening 5 and is, e.g., in the form of an ultrasonic sensor. The distance sensor 6 transmits a sound signal, e.g., on request from an electronic controller, and outputs an acknowledgment signal to the controller on receiving reflections of the sound signal. From the time difference between the request for a sound output and the acknowledgment signal, a conclusion can be drawn in a known manner regarding the distance D between the distance sensor and the obstruction 3.

The opening 5 has, e.g., a profile by means of which the emitted sound of the distance sensor 6 is focused, e.g., a parabolic or elliptical profile.

Instead of mounting the distance sensors 6 or other distance sensors in the described impact buffers, the distance sensors can also be disposed as separate components on the vehicle 1, 2, e.g., adjacent to impact buffers or at other positions. The distance sensors can, as illustrated in FIGS. 1 and 3, be disposed on the rear of the vehicle at about the height of the loading area or even at other positions, e.g., on a rear bumper.

The vehicle combination described using FIGS. 1 and 3 comprises two doors 19 that can swivel about respective vertical axes as adjustable vehicle components, which, in certain positions, protrude beyond the rear of the vehicle. If the doors 19 are opened, they protrude beyond the rear of the vehicle 23 to a certain extent.

The doors 19 are Fitted with position sensors, e.g., in the form of proximity switches, with which the position of the doors 19 is detected.

FIG. 4 shows an embodiment of a vehicle combination in which the trailer 2 comprises a loading platform 10 as an adjustable vehicle component that can swivel about a horizontal axis. FIG. 4 shows the loading platform 10 with solid lines in the non-extended position and with broken lines in an extended position 12. In the extended position 12, the loading platform 10 protrudes beyond the rear of the vehicle 23. An arrow emanating from the impact buffers 4 towards the right shows the detection direction of the distance sensors 6. As can be seen, the distance sensors 6 do not measure the loading platform 10 in the extended position 12 at the correct distance from the loading ramp 3. There are therefore two further distance sensors 11 mounted on the loading platform 10 in the embodiment according to FIG. 4. The arrow pointing upwards from the other distance sensors 11 in the non-extended position of the loading platform 10 shows the detection direction of the distance sensors. In the extended position 12 of the loading platform 10 the detection direction of the other distance sensors 11 is shown by the dashed arrow.

FIG. 5 shows a rear area monitoring device, which can be disposed, e.g., on the vehicle according to FIGS. 1 and 3 or on the vehicle according to FIG. 4, e.g., on the tractor unit 1 or on the trailer 2. The rear area monitoring device comprises an electronic control device 20, 25, which, e.g., comprises a microprocessor that executes a control program having different control and regulating functions. The electronic control device 20, 25 can be constructed in one piece or in a plurality of parts. A multi-part design is illustrated in FIG. 5 by way of example, in which a brake controller 20 and a rear area monitoring control device 25 are provided as separate electronic modules. In one embodiment, the electronic modules can also be in the form of a common electronic control device.

The brake controller 20 receives input signals from a gearbox controller 16, e.g., a reversing signal that indicates when reverse gear is engaged. Furthermore, from a brake signal transmitter 14 having a brake pedal 22, the brake controller 20 receives a brake demand signal that indicates the driver's wish for brake operation. Furthermore, from one or a plurality of speed sensors 21, which can, e.g., be in the form of wheel revolution rate sensors of an anti-lock brake system, the brake controller 20 receives a speed signal that indicates the speed of the vehicle. The brake controller 20 can output actuation signals as output signals to a brake actuator 13 and an engine controller 17. By means of the actuation signals, the brake controller 20 can, e.g., adjust the engine revolution rate or engine power to a lower value than that specified by the driver. In addition, a vehicle brake connected to the vehicle wheels 7, 9 can be automatically operated by means of the brake actuator 13.

The rear area monitoring control device 25 receives data from the distance sensors 6, 11 and determines therefrom a distance signal that indicates the distance of the rear of the vehicle 23 from an obstruction, e.g., the loading ramp 3. The rear area monitoring control device 25 can output the distance signal, e.g., to an output 18, e.g., a display panel, a warning lamp or an acoustic signal generator.

The rear area monitoring control device 25 also comprises an input connector 24 for connecting a position sensor 15. A plurality of connectors 24 for a plurality of position sensors can also be provided. It is also possible to connect a plurality of position sensors to the one input connector 24, e.g., by connecting the position sensors to each other. The position sensor 15 outputs a signal to the rear area monitoring control device 25 that indicates whether the vehicle component protruding beyond the rear of the vehicle, i.e., the doors 19 or the loading platform 10, is in a position protruding beyond the rear of the vehicle 23 or not.

The distance sensors 6 thereby provide data D1 and the distance sensors 13 provide data D2. If only the distance sensors 6 are provided, as with the vehicle, according to FIGS. 1 and 3, then the distance sensors provide the data D.

The rear area monitoring control device 25 determines the distance signal based on the data D1 of the distance sensors 6 if the lifting platform 10 is not extended, i.e., it is in the vertical position. If the lifting platform 10 is extended and is in the horizontal position 12, the rear area monitoring control device 25 determines the distance signal based on the data D2 of the other distance sensors 11. The distance sensors 6 thus form a first subset of the distance sensors and the distance sensors 13 form a second subset of the distance sensors.

With the embodiment of the vehicle according to FIGS. 1 and 3, in which no other distance sensors 11 are provided, the rear area monitoring control device 25 determines the distance signal with the doors 19 closed directly from the data D of the distance sensors 6. With the doors 19 opened, the rear area monitoring control device 25 subtracts a specified difference value from the data of the distance sensors 6 that corresponds to the maximum extent to which the doors 19 can protrude beyond the rear of the vehicle 23.

The distance signal A is, e.g., determined as:

$A=D$ wherein it is assumed therefrom that the data D are already present in a processed form, i.e., are determined, e.g., in a metric unit. The rear area monitoring control device 25 can take account of the signal of the position sensor 15, e.g., such that the data D detected by the distance sensors are corrected by a specified difference value DW:

$A=D-DW$

The distance signal A can also already contain a comparison with a first limit G1. In this case, the distance signal A can, e.g., be a digital signal with the values 0 and 1:

$A=0$, if $D>G1$ $A=1$, if $D<G1$

In order to take into account the signal of the position sensor 15, e.g., one of the following corrections can be carried out, wherein G2 is a second limit:

$A=1$, if $D-DW<G1$ or $D<G1+DW$ or $D<G2$, wherein $G2=G1+DW$

In other cases $A=0$.

If the data D1 and D2 of the first subset and the second subset of the distance sensors are available, the following applies:

$D=D2$ if the signal of the position sensor 15 is indicating a vehicle component 10, 19 protruding beyond the rear of the vehicle 23; and $D=D1$ in other cases.

The signal of the position sensor 15 can, as assumed previously, be a binary signal that only distinguishes between the states "vehicle component protruding beyond the rear of the vehicle" and "vehicle component not protruding beyond the rear of the vehicle". In one embodiment of the present invention, the position sensor is in the form of a sensor with a known value range, so that intermediate values between the positions "open" and "closed" can also be signaled. Thus, e.g., a signal P of the position sensor can represent an extent of the protrusion of the adjustable component of the vehicle 10, 19 beyond the rear of the vehicle 23. The signal P can represent the extent of the protrusion, e.g., directly in a metric unit. In this case, the rear area monitoring control device 25 can take into account the signal P of the position sensor 15 for determining the distance signal A, e.g., as follows:

$A=D-P$

The rear area monitoring control device 25 can exchange data with the brake controller 20 via a data connection 26, e.g., a bus system. The rear area monitoring control device 25 receives, e.g., information about an engaged reverse gear from the brake controller 20 via the data connection 26. The rear area monitoring control device 25 can also output a brake demand signal via the data connection 26 to the brake controller 20, which then implements the same in the form of a brake operation.

The input connector 24 for the position sensor 15 provided on the rear area monitoring control device 25 according to FIG. 5 can also be provided on the brake controller 20. In this case, the brake controller 20 transfers the signal of the position sensor 15 to the rear area monitoring control device 25 via the data connection 26. It is also possible that the output 18 is connected to the brake controller 20. In this case, the rear area monitoring control device 25 transfers the information to be output via the output 18 to the brake controller 20 via the data connection 26, and the brake controller 20 then carries out the actual outputting.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover ail of the generic and specific features of the invention herein described and all statements of the scope of the invention that, as a matter of language, might be said to fall therebetween.

What is claimed is:

1. A rear area monitoring device for a vehicle, comprising:
    at least one distance sensor configured to measure a distance between the rear of the vehicle and an obstruction, and to generate corresponding distance data;
    at least one position sensor configured to detect a position of at least one component of the vehicle that, in certain positions, protrudes beyond the rear of the vehicle, and to generate position data including first position data when the at least one component protrudes beyond the rear of the vehicle by a first amount, and second position data when the at least one component protrudes beyond the rear of the vehicle by a second amount; and
    at least one electronic control device including at least one input connector for connecting to the at least one position sensor, the at least one electronic control device being configured to receive and evaluate the distance data from the at least one distance sensor and the position data from the at least one position sensor, and to determine a distance signal that indicates the actual distance of the rear of the vehicle from the obstruction based on the evaluation.

2. The rear area monitoring device as claimed in claim 1, wherein the at least one electronic control device is configured to correct the distance data received from the at least one distance sensor by a specified difference value when the position data received from the at least one position sensor indicates that the at least one component is protruding beyond the rear of the vehicle.

3. The rear area monitoring device as claimed in claim 1, wherein the at least one electronic control device is configured to compare the distance data received from the at least one distance sensor with at least one specified first limit to determine whether the distance signal one of reaches and is below a specified distance of the rear of the vehicle from the obstruction.

4. The rear area monitoring device as claimed in claim 3, wherein the at least one electronic control device is configured to one of (i) correct one of the distance data received from the at least one distance sensor, the at least one specified first limit, and a difference between the distance data received from the at least one distance sensor and the specified first limit by a specified difference value and (ii) compare the distance data received from the at least one distance sensor with at least one specified second limit when the position data received from the at least one position sensor indicates that the at least one component is protruding beyond the rear of the vehicle.

5. The rear area monitoring device as claimed in claim 1, wherein the at least one electronic control device is configured to output the distance signal at least one of visually, haptically and acoustically via one of an output of the rear area monitoring device and an interface to another output of the vehicle.

6. The rear area monitoring device as claimed in claim 1, wherein the at least one electronic control device is configured to generate, based on the distance signal, a brake actuation signal by which at least one vehicle brake is automatically operated.

7. The rear area monitoring device as claimed in claim 1, wherein the at least one distance sensor includes at least two distance sensors, and the at least one electronic control device is configured to determine the distance signal based on a portion of the distance data received from a first subset of the at least two distance sensors when the position data received from the at least one position sensor indicates that the at least one component is not protruding beyond the rear of the vehicle, and to determine the distance signal based on another portion of the distance data received from a second subset of the at least two distance sensors when the position data received from the at least one position sensor indicates that the at least one component is protruding beyond the rear of the vehicle.

8. The rear area monitoring device as claimed in claim 7, wherein the first subset of the at least two distance sensors is configured for attachment to the rear of the vehicle and the second subset of the at least two distance sensors is configured for attachment to the at least one component.

9. A vehicle, comprising at least one component that, in certain positions, protrudes beyond the rear of the vehicle, and the rear area monitoring device according to claim 1.

10. The vehicle as claimed in claim 9, wherein the at least one distance sensor includes at least two distance sensors, a first subset of the at least two distance sensors being attached to the rear of the vehicle and a second subset of the at least two distance sensors being attached to the at least one component.

11. The rear area monitoring device as claimed in claim 1, wherein the extent of protrusion of the at least one component is at a maximum when the at least one component is in an open position, at a minimum when the at least one component is in a closed position, and between maximum and minimum when the at least one component is in any of a plurality of intermediate positions between the open and dosed positions.

12. An electronic control device of a rear area monitoring device for a vehicle, the rear area monitoring device comprising at least one distance sensor configured to measure a distance between the rear of the vehicle and an obstruction, and to generate corresponding distance data, and at least one position sensor configured to detect a position of at least one component of the vehicle that, in certain positions, protrudes beyond the rear of the vehicle, and to generate position data including first position data when the at least one component protrudes beyond the rear of the vehicle by a first amount, and a second position data when at least one component protrudes beyond the rear of the vehicle by a second amount, the electronic control device comprising:
    at least one electronic input connector for connecting to the at least one position sensor, the electronic control device being configured to receive distance data from the at least one distance sensor, and configured to evaluate the distance data from the at least one distance sensor and the position data from the at least one position sensor, and to determine a distance signal that indicates the actual distance of the rear of the vehicle from the obstruction based on the evaluation.

* * * * *